(12) United States Patent
Qiu et al.

(10) Patent No.: US 11,856,682 B2
(45) Date of Patent: Dec. 26, 2023

(54) METHOD FOR MEASURING PLASMA ION NONEXTENSIVE PARAMETER

(71) Applicant: NANCHANG UNIVERSITY, Nanchang (CN)

(72) Inventors: Huibin Qiu, Nanchang (CN); Zuozhi Hu, Nanchang (CN); Donghua Xiao, Nanchang (CN); Shengfa Wu, Nanchang (CN); Chengjie Zhong, Nanchang (CN); Jiangcun Chen, Nanchang (CN); Chaozhe Hu, Nanchang (CN); Xiaobin Li, Nanchang (CN); Junjie Wu, Nanchang (CN); Junhui Liu, Nanchang (CN); Yizhen Bao, Nanchang (CN); Xiaoyang Zhang, Nanchang (CN); Runrui Dai, Nanchang (CN); Lihuan Liu, Nanchang (CN); Jianing Xu, Nanchang (CN); Xu Tu, Nanchang (CN); Juecong Zhang, Nanchang (CN); Peng Guo, Nanchang (CN); Shuyu Long, Nanchang (CN); Huang Weng, Nanchang (CN); Chenyu Tong, Nanchang (CN); Sanqiu Liu, Nanchang (CN)

(73) Assignee: NANCHANG UNIVERSITY, Nanchang (CN)

( * ) Notice: Subject to any disclaimer, the term of this patent is extended or adjusted under 35 U.S.C. 154(b) by 0 days.

(21) Appl. No.: 18/107,239

(22) Filed: Feb. 8, 2023

(65) Prior Publication Data
US 2023/0189423 A1 Jun. 15, 2023

Related U.S. Application Data

(63) Continuation of application No. PCT/CN2021/142834, filed on Dec. 30, 2021.

(30) Foreign Application Priority Data

Jan. 18, 2021 (CN) .......................... 202110059985.5

(51) Int. Cl.
*H05H 1/00* (2006.01)

(52) U.S. Cl.
CPC .............................. *H05H 1/0081* (2013.01)

(58) Field of Classification Search
CPC .................................................. H05H 1/0081
See application file for complete search history.

(56) References Cited

U.S. PATENT DOCUMENTS

| | | | | |
|---|---|---|---|---|
| 5,203,960 A | * | 4/1993 | Dandl | ............... H01J 37/32678 438/758 |
| 2006/0065623 A1 | * | 3/2006 | Guiney | ............ H01J 37/32935 216/61 |

(Continued)

FOREIGN PATENT DOCUMENTS

CN 110740558 A 1/2020

*Primary Examiner* — Marcus H Taningco

(57) ABSTRACT

The present invention relates to a method for measuring the ion nonextensive parameter of plasma includes the following steps: describe the plasma with nonextensive statistical mechanics, obtain the equation describing the relationship between the geodesic acoustic mode frequency and the ion acoustic speed of plasma; collect the measurement data of the geodesic acoustic mode frequencies and plasma temperature in the device where the plasma is to be measured; the obtained equation describing the relationship between the geodesic acoustic mode frequency and the ion acoustic speed of plasma is used to linearly fit the collected measured data of the geodesic acoustic mode frequency and the plasma temperature in the device where the plasma is to be measured to obtain the slope value; based on the derived equation and the obtained slope values, and combining with the safety factor of the device where the plasma is to be (Continued)

measured, the ion nonextensive parameter is solved numerically. The present invention fills the gap where the electron nonextensive parameter can be measured with the nonextensive single electric probe, but the corresponding ion nonextensive parameter cannot be diagnosed yet in the field of nonextensive parameters diagnosis.

4 Claims, 5 Drawing Sheets

(56) References Cited

U.S. PATENT DOCUMENTS

| 2006/0214593 A1* | 9/2006 | Denpoh | H05H 1/0081 315/111.81 |
| 2012/0283973 A1* | 11/2012 | Samara | H01J 37/32935 702/65 |
| 2022/0110206 A1* | 4/2022 | Qiu | H05H 1/0081 |

* cited by examiner

METHOD FOR MEASURING PLASMA ION NONEXTENSIVE PARAMETER

TECHNICAL FIELD

The present invention relates to the field of measurement of the plasma nonextensive parameter, particularly to a method for measuring the plasma ion nonextensive parameter.

BACKGROUND

Plasma is the fourth state of matter, different from solids, liquids and gases. Matter is made up of molecules, which are made up of atoms, which consist of a positively charged nucleus and negatively charged electrons that surround it. When heated to a high enough temperature or for other reasons, the outer electrons become free from the nucleus and become free electrons, like students running out onto the playground after class to play casually. The electrons leave the nucleus in a process called "ionization". At this point, matter becomes a homogeneous "paste" of positively charged nuclei and negatively charged electrons, hence the joking term ionic paste, which is approximately electrically neutral because the total positive and negative charges in these ionic pastes are equal.

Theoretical analysis and a large number of experiments prove that the components of the plasma do not satisfy Boltzmann-Gibbs statistics and can be well described by nonextensive statistical mechanics. The consideration of nonextensivity effects is very important to the accurate diagnosis of plasma parameters. When the nonextensivity effects are not considered, the diagnosis error of the electric probe may be as high as 83.91%. Therefore, we must consider the influence of nonextensive parameters and the measurement of the nonextensive parameters is a must. Common plasma nonextensive parameters include electron nonextensive parameter and ion nonextensive parameter. We have been able to measure electron nonextensive parameter. However, the ion nonextensive parameter cannot be measured yet.

It is for these reasons that the present invention has been designed as a method for measuring the ion nonextensive parameter of plasma.

SUMMARY

The present invention aims to overcome the shortcomings of the prior art and provide a method for measuring the ion nonextensive parameter of plasma. It fills the gap where the electron nonextensive parameter can be measured with the nonextensive single electric probe, but the corresponding ion nonextensive parameter cannot be diagnosed yet in the field of nonextensive parameters diagnosis. It can be extended to the ion nonextensive parameter diagnosis method which includes effects of elongation, triangle deformation and electron.

In order to realize the purpose of the invention, the technical scheme adopted by the invention:

The invention discloses a method for measuring the ion nonextensive parameter of plasma, including the following steps:

step 1, describing the plasma with nonextensive statistical mechanics to obtain an equation describing the relationship between the geodesic acoustic mode frequency and the ion acoustic speed of plasma;

step 2, collecting the measurement data of the geodesic acoustic mode frequencies and plasma temperature in the device where the plasma is to be measured;

step 3, using the equation describing the relationship between the geodesic acoustic mode frequency and the ion acoustic speed of plasma derived in step 1 to obtain the slope value by linearly fitting the measurement data of the geodesic acoustic mode frequency and plasma temperature collected in step 2 in the device where the plasma to be measured;

step 4, according to the formula obtained in step 1 and the slope value obtained in step 3, combined with the safety factor of the device where the plasma is to be measured to obtain the ion nonextensive parameter by numerical solution.

preferably, the formula describing the relationship between the geodesic acoustic mode frequency and the ion acoustic speed of plasma in step 1 is as follows:

$$f_{GAM} = \sqrt{S(q_{F_i}, q)} \frac{c_s}{2\pi R_0} = \sqrt{\frac{7}{4(3q_{F_i}-1)}\left(1 + \sqrt{1 + \frac{4}{q^2}\frac{2(5q_{F_i}-3)(3q_{F_i}-1)}{\left[-\frac{7}{2(3q_{F_i}-1)}\right]^2}}\right)} \frac{v_{ti}}{2\pi R_0}$$

where $v_{ti}$ is the ion effective thermal speed, $c_s$ is ion acoustic speed, $q_{F_i}$ is the ion nonextensive parameter, $R_0$ is the major radius of the tokamak plasma, q is the safety factor of the device.

preferably, it also includes step 5 for drawing a SSE–$q_{F_i}$ curve using a sum of squares due to error (SSE) as a goodness of fit measure;

step 6, obtaining a value of the ion nonextensive parameter corresponding to a minimum value of the SSE according to the SSE–$q_{F_i}$ curve;

step 7, drawing a $R^2$–$q_{F_i}$ curve using a nonlinear fitting coefficient of determination $R^2$ as a goodness of fit measure;

step 8, obtaining a value of the ion nonextensive parameter corresponding to a maximum value of the $R^2$ according to the $R^2$–$q_{F_i}$ curve;

step 9, comparing the values of the ion nonextensive parameter respectively corresponding to the minimum value of the SSE obtained in the step 6 and the maximum value of the $R^2$ obtained in the step 8;

step 10, determining whether the values of the ion nonextensive parameter compared in the step 9 are consistent;

step 11, confirming any one of the values of the ion nonextensive parameter as an optimal value of the ion nonextensive parameter when the values of the ion nonextensive parameter are determined to be consistent;

step 12, substituting the optimal value of the ion nonextensive parameter obtained in the step 11 into the data set in the step 3 and step 4 to obtain a target data set corresponding to the optimal value of the ion nonextensive parameter;

step 13, outputting a measurement result report.

preferably, in step 2, the device where the plasma to be measured is T-10 tokamak device.

The beneficial effects of the invention lie in:

1. The present invention fills the gap where the electron nonextensive parameter can be measured with the nonextensive single electric probe, but the corresponding ion nonextensive parameter cannot be diagnosed yet in the field of nonextensive parameters diagnosis; it can be generalized to the diagnosis of ion nonextensive parameters including effects of elongation, triangle deformation, and electron.

In the picture, 1 is ion gun, 2 is defection plate, 3 is primary beam, 4 is secondary beam, 5 is primary beam detector, 6 is electrostatic analyzer.

DETAILED DESCRIPTION OF EMBODIMENTS

The invention is described in detail below in conjunction with the attached drawings.

See FIGS. 1-5.

The invention provides a method for measuring ion nonextensive parameter of plasma. In order to obtain the geodesic acoustic mode theory under the nonextensive statistical framework consistent with the experiment, we extend the geodesic acoustic mode theory under the Boltzmann-Gibbs statistical framework to the theory under the nonextensive statistical framework. The obtained geodesic acoustic mode dispersion relationship under the nonextensive statistical framework is as follows:

$$f_{GAM} = \frac{\omega_{GAM}}{2\pi} = \sqrt{S(q_{F_i}, q)} \frac{c_s}{2\pi R_0} \quad (1)$$

where $$S(q_{F_i}, q) = \frac{7}{4(3q_{F_i} - 1)} \left(1 + \sqrt{1 + \frac{4}{q^2} \frac{2(5q_{F_i} - 3)(3q_{F_i} - 1)}{\left[-\frac{7}{2(3q_{F_i} - 1)}\right]^2}}\right), \quad (2)$$

$$\left(q_{F_i} > \frac{1}{3}\right)$$

The above formula is clearly illustrated as follows: the geodesic acoustic mode frequency is proportional to the ion acoustic speed, which is supported by the fluid and kinetic theory and experimental data, while what is different from the theory under the Boltzmann-Gibbs (extensive) statistical framework is that the proportional coefficient is not only a function of the safety factor, but also a function of nonextensive parameters: the proportional coefficient decreases with the increase of the safety factor, and also decreases with the increase of the ion nonextensive parameter; substitute Eq. (2) into Eq. (1), and $c_s$ approximately equal to the $v_{ti}$, the following formula is obtained:

$$f_{GAM} = \sqrt{S(q_{F_i}, q)} \frac{c_s}{2\pi R_0} =$$

$$\sqrt{\frac{7}{4(3q_{F_i} - 1)} \left(1 + \sqrt{1 + \frac{4}{q^2} \frac{2(5q_{F_i} - 3)(3q_{F_i} - 1)}{\left[-\frac{7}{2(3q_{F_i} - 1)}\right]^2}}\right)} \frac{v_{ti}}{2\pi R_0}$$

This indicates that the geodesic acoustic mode $f_{GAM}$-$c_s$/$2\pi R_0$ curve (the theoretical cornerstone of ion nonextensive parameter diagnosis) has a kind of complicated dependence on nonextensive parameters, which is different from the traditional (excluding nonextensive parameters) geodesic acoustic mode theory; in addition, we found that at the extensive limit ($q_{F_i}=1$), the above results all return to the traditional theory based on Boltzmann-Gibbs statistical framework, which supports the correctness and universality of the nonextensive theory (namely a larger scope of application).

The above analysis has shown that nonextensive parameters have an influence on the geodesic acoustic mode $f_{GAM}$-$c_s$/$2\pi R_0$ curve; based on this theory, next, we will explain how to measure ion nonextensive parameters that cannot be measured even with a nonextensive single electric probe.

Figure 1:
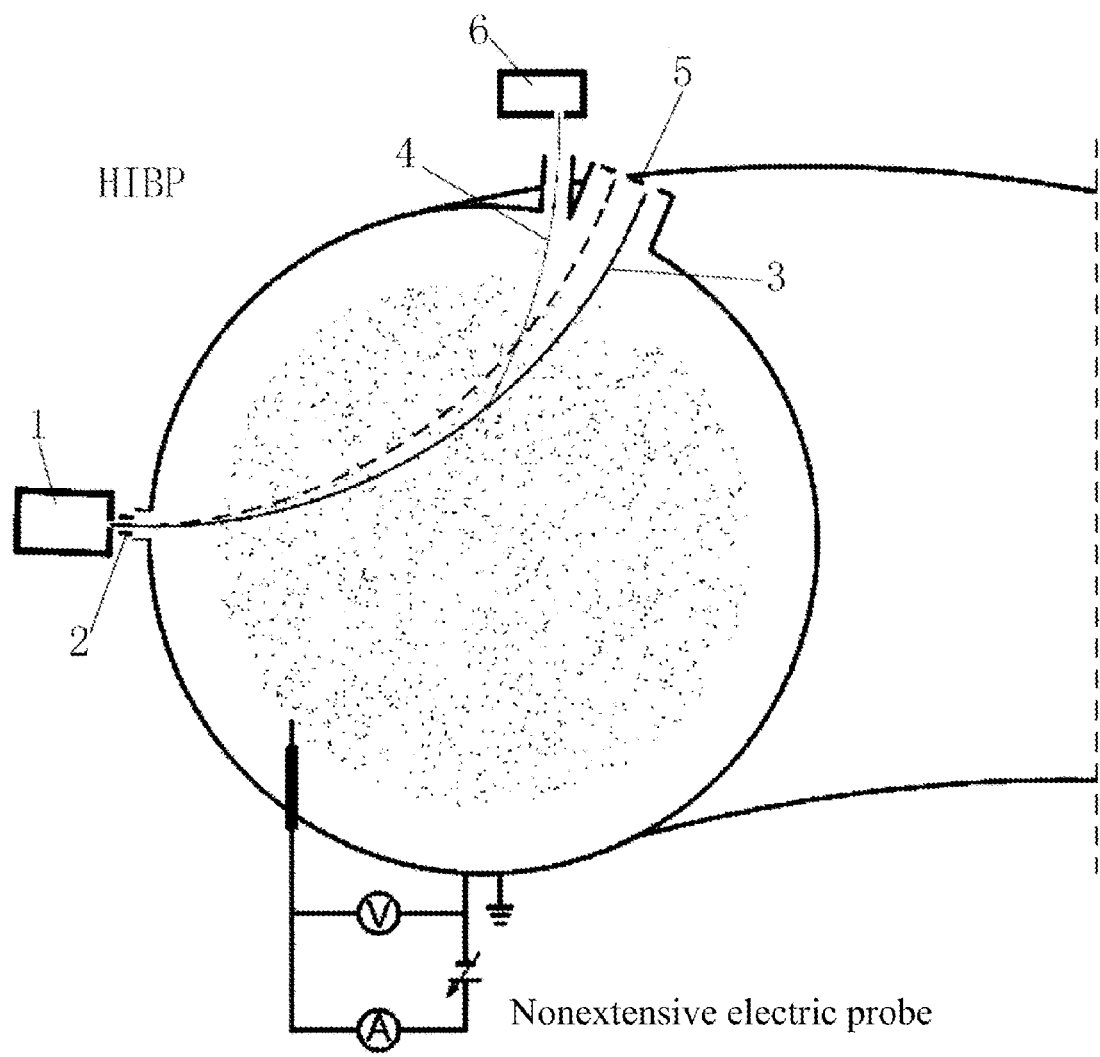
FIG. 1 is a schematic diagram of the frequency measurement method HIBP and nonextensive electric probe used in the T-10 tokamak device of the present invention.
Figure 2:
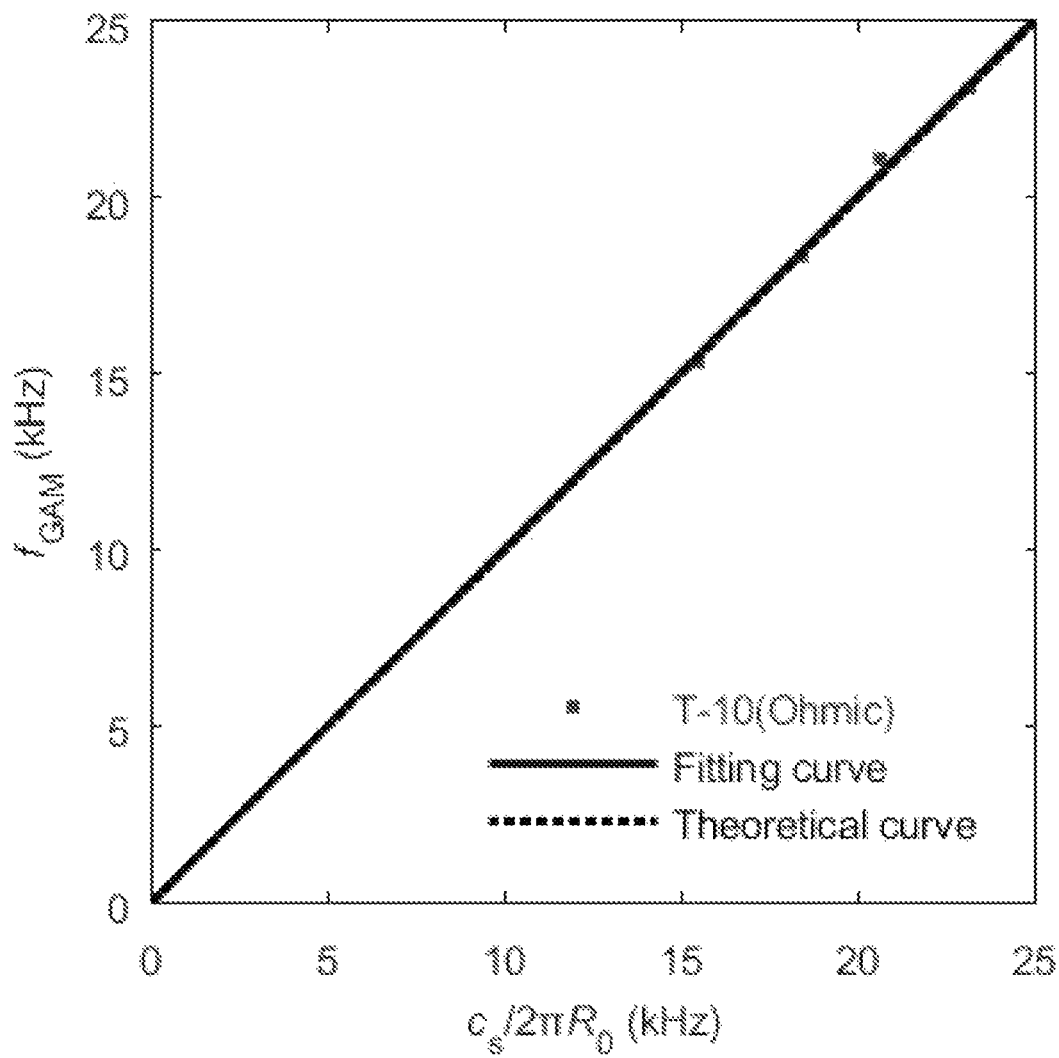
FIG. 2 is the experimental data analysis of the geodesic acoustic model on the T-10 tokamak device of the present invention.

As shown in FIG. 2, in order to measure ion nonextensive parameter, we can first measure the geodesic acoustic mode frequency and electron temperature of the plasma to be measured in a particular tokamak device by the present method, the present embodiment adopts the frequency measurement method HIBP and nonextensive electric probe already used by the T-10 tokamak device as shown in FIG. 1. In this invention, 4 experimental data points were obtained for the plasma generated by 36815 discharges of the T-10 tokamak device.

Figure 3:
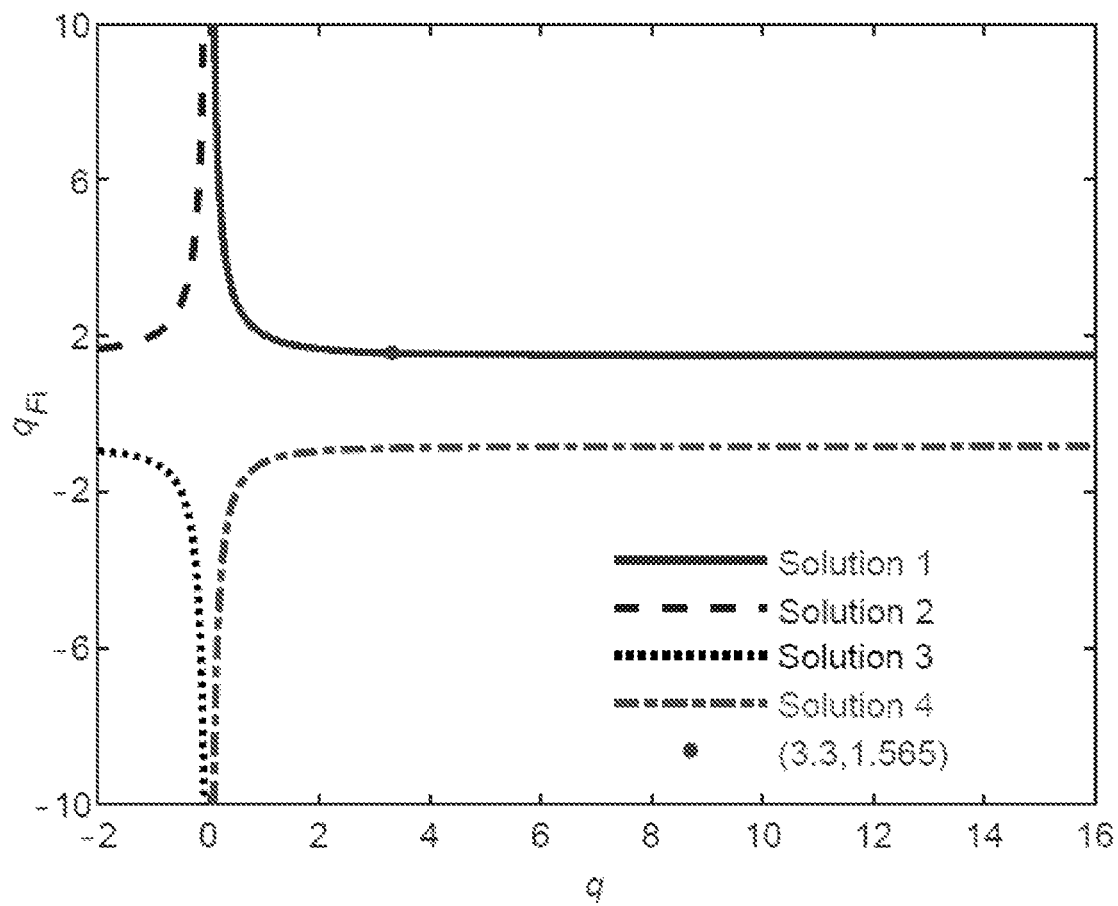
FIG. 3 is a measurement diagram of ion nonextensive parameter of plasma generated by 36815 shot on T-10 tokamak device in the present invention.

As shown in FIG. 3, Then the least square method is used to fit this set of experimental data. Since both the theory and the experiment have proved the relationship between $f_{GAM}$ and $c_s$/$2\pi R_0$ is the direct proportional, we make a linear fitting of the direct proportional function without intercept. It turns out that the optimal slope is $\sqrt{S}$=1.003, as shown in Table 1 below.

TABLE 1

Parameters related to plasma generated by 36815 shot on T-10 Tokamak device.

| $\sqrt{S}$ | SSE | $R^2$ | q | $q_{Fi}$ |
|---|---|---|---|---|
| 1.003 | 0.284 | 0.992 | 3.3 | 1.565 |

Then, according to equation (2), the relationship between the safety factor q and the ion nonextensive parameter $q_{F_i}$ is known. Since q=3.3 is the safety factor of 36815 shot on T-10 device, the corresponding ion nonextensive parameter $q_{F_i}$=1.565 can be solved. The four curves are the $q_{F_i}$-q figure given by Eq. (2) combining with the slop $\sqrt{S}$=1.003 obtained from figure $f_{GAM}$-$c_s$/$2\pi R_0$. As you can see from the diagram, there are four groups of solutions, and here, from a physical point of view, we only consider the group of solutions represented by the red real curve. $q_{F_i}$=1.565 is the ion nonextensive parameter of plasma generated by 36815 shot (safety factor q=3.3) on T-10 device.

Figure 4:
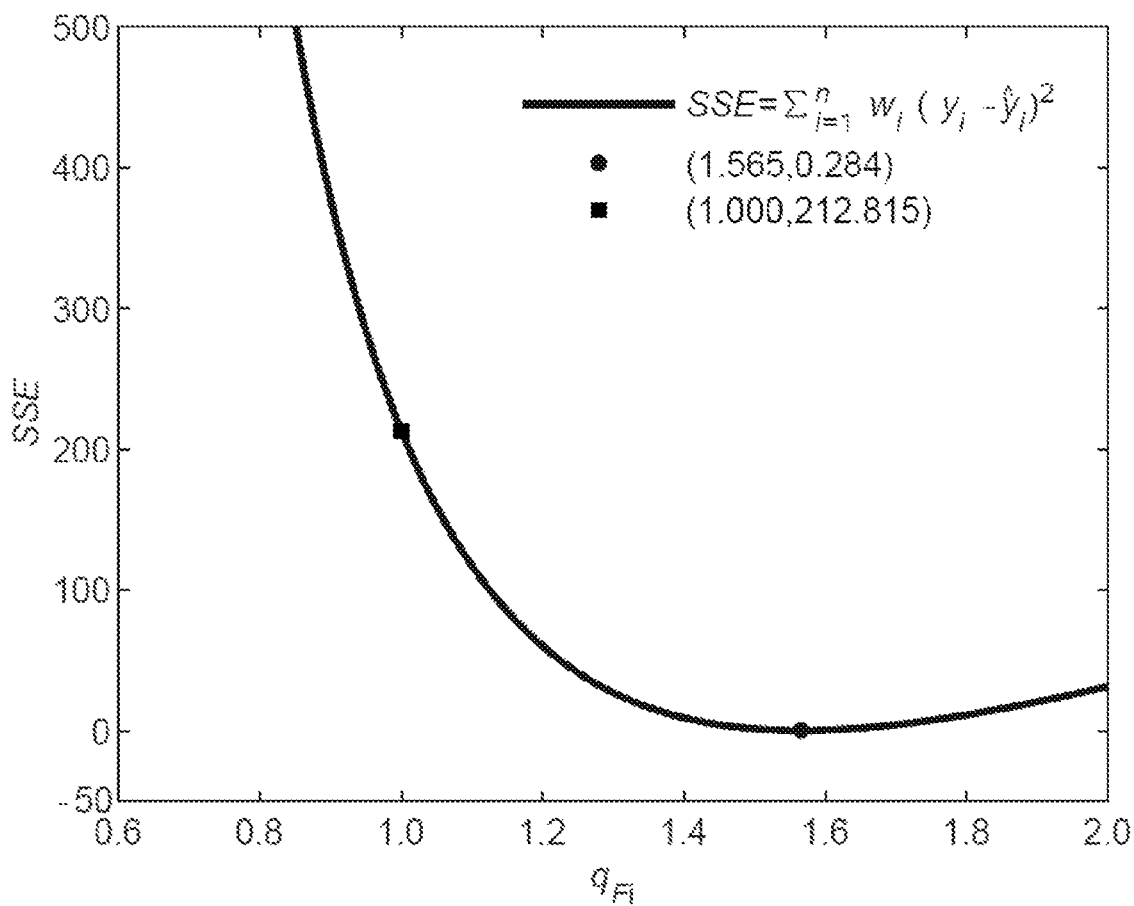
FIG. 4 is the analysis graphs of statistic SSE for the optimal ion nonextensive parameters in the present invention.

As shown in FIG. 4, In order to illustrate that $q_{F_i}$=1.565 is the optimal ion nonextensive parameter, statistics SSE and $R^2$ are analyzed. We found that when the ion nonextensive parameter $q_F$ takes different values, SSE also takes different values and gets the minimum value when $q_{F_i}$=1.565, indicating that $q_{F_i}$=1.565 is the optimal ion nonextensive parameter. In order to confirm the reliability of the results measured with the statistic SSE.

Figure 5:
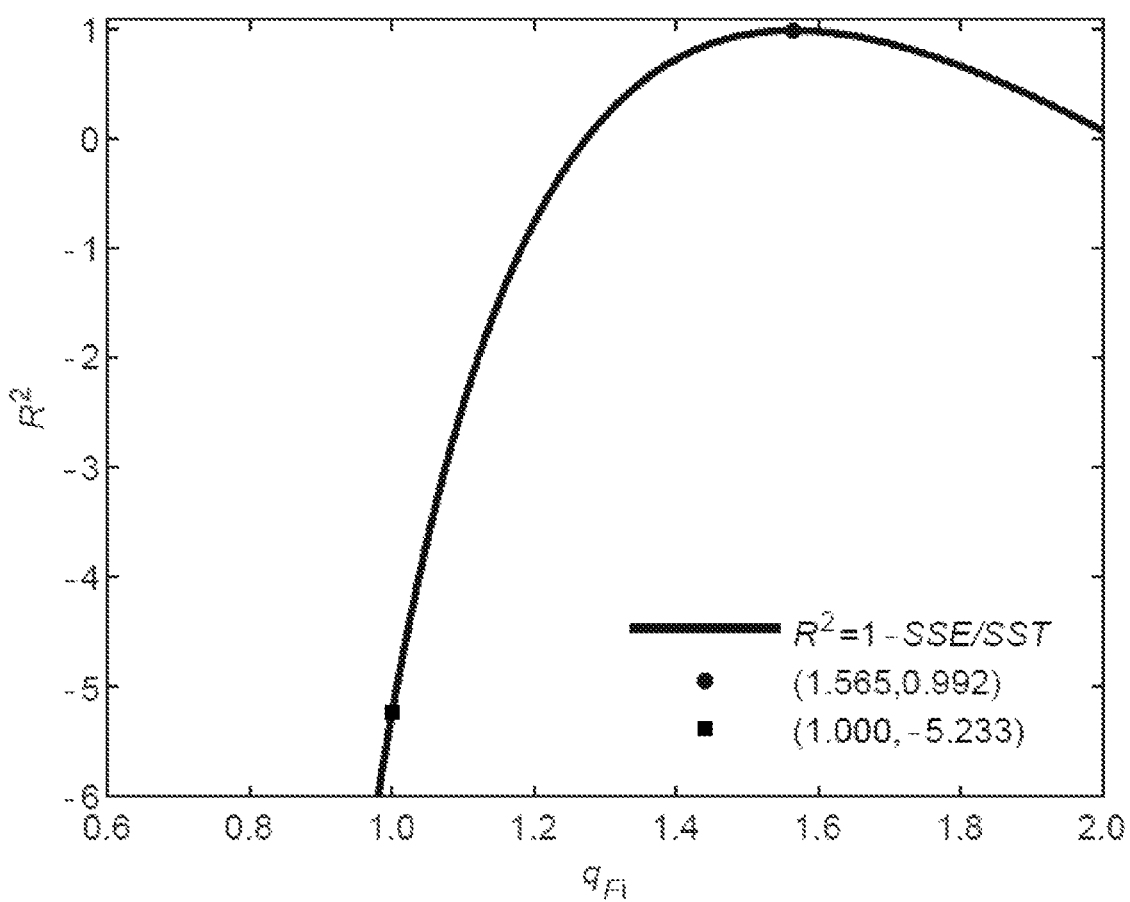
FIG. 5 is the analysis graphs of statistic $R^2$ for the optimal ion nonextensive parameters in the present invention.

As shown in FIG. 5, we also analyzed another independent indicator $R^2$, and made an $R^2$–$q_{F_i}$ graph, and also found that when $q_{F_i}$=1.565, $R^2$ achieves the maximum value, which confirms $q_{F_i}$=1.565 is the optimal ion nonextensive parameter, that is, the measurement result of the ion nonextensive parameter of the plasma generated by 36815 shot on T-10 tokamak device is $q_{F_i}$=1.565.

The results show the effectiveness of a method for measuring ion nonextensive parameters in a tokamak device. Recent studies have shown that replacing Boltzmann-Gibbs statistical mechanics with nonextensive statistical mechanics has a strong advantage in describing plasmas. The diagnosis error without using nonextensive statistical mechanics to describe the plasma may be as high as 83.91%. We established the theory of nonextensive geodesic acoustic mode by introducing nonextensive statistical mechanics to take into account the system nonextensivity which has been proven by a large number of facts. This theory not only can obtain the related results of the traditional geodesic acoustic mode at the extensive limit, which proves the correctness of the nonextensive geodesic acoustic mode theory, but also can measure the ion nonextensive parameter ($q_{F_i}$=1.565, see FIG. 3) that cannot be measured even with a nonextensive single electric probe by combining the existing diagnosis methods of geodesic acoustic mode frequency and plasma electron temperature (such as nonextensive electric probe).

The present invention fills the gap where the electron nonextensive parameter can be measured with the nonextensive single electric probe, but the corresponding ion nonextensive parameter cannot be diagnosed yet in the field of nonextensive parameters diagnosis.

The above is only an embodiment of the invention, does not therefore limit the scope of the patent of the invention, all equivalent transformations made by the contents of the description and drawings of the invention or direct or indirect application in related technical fields, are included in the patent protection scope of the invention.

What is claimed is:

1. A method for measuring an ion nonextensive parameter of a plasma, comprises:
    step 1, describing the plasma with nonextensive statistical mechanics to obtain an equation describing a relationship between a geodesic acoustic mode frequency and an ion acoustic speed of plasma;
    step 2, measuring the geodesic acoustic mode frequency by a heavy ion beam probe (HIBP) and a plasma temperature by a nonextensive electric probe, and collecting measurement data of the geodesic acoustic mode frequency and the plasma temperature in a device where the plasma is to be measured; wherein the device where the plasma is to be measured is a target tokamak device;
    step 3, using the equation describing the relationship between the geodesic acoustic mode frequency and the ion acoustic speed of plasma derived in step 1 to obtain a slope value by linearly fitting the measurement data of the geodesic acoustic mode frequency and the plasma temperature collected in step 2 in the device where the plasma to be measured; and
    step 4, according to the equation obtained in step 1 and the slope value obtained in step 3, combined with a safety factor of the device where the plasma is to be measured to obtain the ion nonextensive parameter by numerical solution as a measurement result of the plasma in the target tokamak device.

2. The method according to claim 1, wherein a formula of describing a relationship between the geodesic acoustic mode frequency and the ion nonextensive parameter of plasma in step 1 is:

$$f_{GAM} = \sqrt{S(q_{F_i}, q)} \frac{c_s}{2\pi R_0} = \sqrt{\frac{7}{4(3q_{F_i}-1)}\left(1 + \sqrt{1 + \frac{4}{q^2}\frac{2(5q_{F_i}-3)(3q_{F_i}-1)}{\left[-\frac{7}{2(3q_{F_i}-1)}\right]^2}}\right)} \frac{v_{ti}}{2\pi R_0}$$

where $v_{ti}$ is an ion effective thermal speed, $c_s$ is an ion acoustic speed, $q_{F_i}$ is the ion nonextensive parameter, $R_0$ is a major radius of tokamak plasma, q is the safety factor of the device.

3. The method according to claim 1, wherein the measuring the ion nonextensive parameter of plasma, comprises:
    step 5, drawing a SSE–$q_{F_i}$ curve using a sum of squares due to error (SSE) as a goodness of fit measure;
    step 6, obtaining a value of the ion nonextensive parameter corresponding to a minimum value of the SSE according to the SSE–$q_{F_i}$ curve;
    step 7, drawing a $R^2$–$q_{F_i}$ curve using a nonlinear fitting coefficient of determination $R^2$ as a goodness of fit measure;
    step 8, obtaining a value of the ion nonextensive parameter corresponding to a maximum value of the $R^2$ according to the $R^2$–$q_{F_i}$ curve;
    step 9, comparing the values of the ion nonextensive parameter respectively corresponding to the minimum value of the SSE obtained in the step 6 and the maximum value of the R2 obtained in the step 8;
    step 10, determining whether the values of the ion nonextensive parameter compared in the step 9 are consistent;
    step 11, confirming any one of the values of the ion nonextensive parameter as an optimal value of the ion nonextensive parameter when the values of the ion nonextensive parameter are determined to be consistent;
    step 12, substituting the optimal value of the ion nonextensive parameter obtained in the step 11 into the data set in the step 3 and step 4 to obtain a target data set corresponding to the optimal value of the ion nonextensive parameter;
    step 13, outputting a measurement result report.

4. The method according to claim 1, wherein the target tokamak device is T-10 tokamak.

* * * * *